(12) United States Patent
Trionfetti et al.

(10) Patent No.: US 7,357,031 B2
(45) Date of Patent: Apr. 15, 2008

(54) PRECISION SENSOR ASSEMBLY FOR ROTATING MEMBERS IN A MACHINE TOOL

(75) Inventors: Gianni Trionfetti, Agrate Brianza (IT); Andrea Guidotti, Carugate (IT)

(73) Assignee: Balance Systems S.r.l., Milan (IT)

( * ) Notice: Subject to any disclaimer, the term of this patent is extended or adjusted under 35 U.S.C. 154(b) by 94 days.

(21) Appl. No.: 11/072,948

(22) Filed: Mar. 7, 2005

(65) Prior Publication Data
US 2005/0193819 A1    Sep. 8, 2005

(30) Foreign Application Priority Data
Mar. 8, 2004    (EP)    .................................. 04425154

(51) Int. Cl.
*G01N 29/00*    (2006.01)
(52) U.S. Cl. .............................. 73/649; 73/593; 73/660
(58) Field of Classification Search .................. 73/649, 73/644, 660, 1.82, 1.84, 650, 632, 633, 651, 73/593
See application file for complete search history.

(56) References Cited

U.S. PATENT DOCUMENTS

| | | | | |
|---|---|---|---|---|
| 3,761,789 A | * | 9/1973 | Krafft et al. ................. | 388/819 |
| 4,397,188 A | * | 8/1983 | Bansevichus et al. ......... | 73/651 |
| 4,447,755 A | | 5/1984 | Ghiurea | |
| 4,562,392 A | | 12/1985 | Davis et al. | |
| 5,663,504 A | * | 9/1997 | Kluft ............................ | 73/660 |
| 5,688,160 A | * | 11/1997 | Pozzetti et al. ................. | 451/5 |
| 6,062,948 A | * | 5/2000 | Schiff et al. .................... | 451/9 |
| 6,848,315 B2 | * | 2/2005 | Matsuki et al. ............... | 73/651 |
| 6,888,288 B2 | * | 5/2005 | Seki et al. ............. | 310/323.16 |
| 7,066,028 B2 | * | 6/2006 | Dondi ......................... | 73/649 |
| 2001/0020384 A1 | | 9/2001 | Mueller et al. | |

FOREIGN PATENT DOCUMENTS

| | | |
|---|---|---|
| CH | 680 389 | 8/1992 |
| GB | 1078228 | 8/1967 |
| WO | WO 03/073051 | 9/2003 |

* cited by examiner

*Primary Examiner*—Hezron Williams
*Assistant Examiner*—Jacques M. Saint-Surin
(74) *Attorney, Agent, or Firm*—Browdy and Neimark

(57) ABSTRACT

A precision sensor assembly for rotating members in a machine tool comprises a rotor unit (16) rigidly fixed to a rotor portion (2*a*) of the machine tool and including a sensor (5) for detecting vibrations produced by the operation of the machine tool, the sensor (5) comprising a piezoelectric sensitive element (6) and members (7, 8) for mechanical amplification of the vibrations. The members (7, 8) comprise at least one resonant system composed of an elastic element (8) and a counter-mass (7) acting on the piezoelectric sensitive element (6). The rotor and stator units (16, 17) comprise inductively coupled transmitting and receiving elements (10, 11) for transferring the signals from the piezoelectric element (6) contactless to the stator unit (17). The stator unit (17) may include an electric amplifier (13) for further amplifying the transmitted signals.

8 Claims, 3 Drawing Sheets

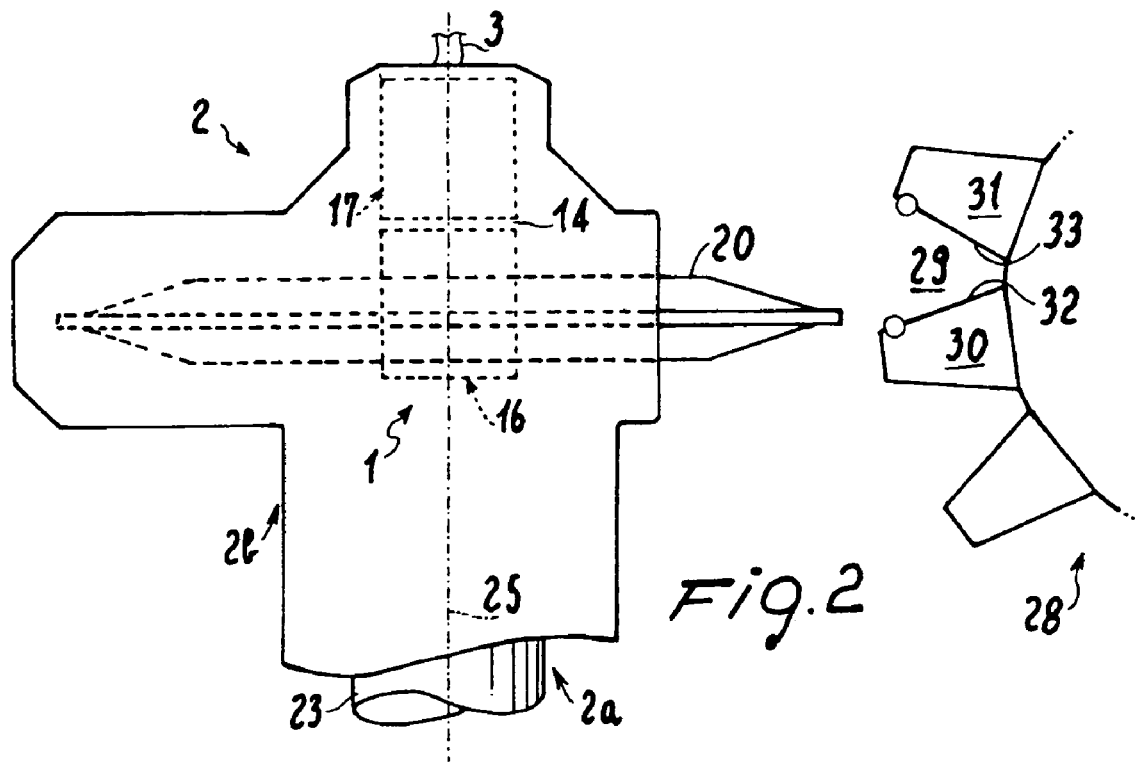
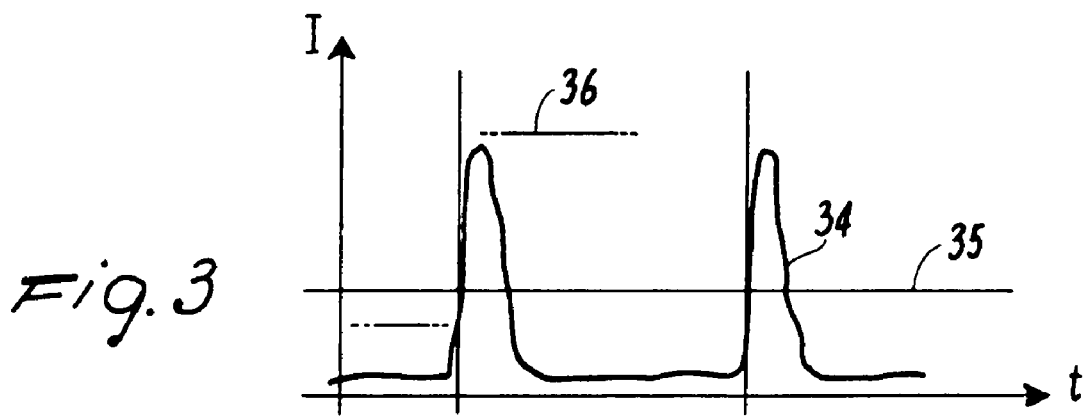
Fig. 2
Fig. 3
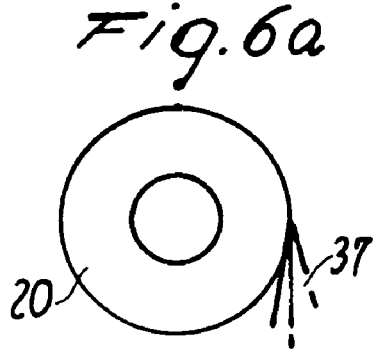
Fig. 6b    Fig. 6a

PRECISION SENSOR ASSEMBLY FOR ROTATING MEMBERS IN A MACHINE TOOL

FIELD OF THE INVENTION

This invention relates to a precision sensor assembly for rotating members in a machine tool.

It is known that there are presently different types of sensors: they represent the primary element of regulation instruments, widely present in machines and tools. The fundamental task of said sensors is to detect a magnitude and convert it into a signal proportional thereto. The signal is processed and transmitted to an actuator that is the final element of the regulation instruments and carries out the regulation.

DESCRIPTION OF THE PRIOR ART

To detect vibrations caused by a specific cause such as a sound, noise, relative contact between two moving surfaces or others, sensors of the acoustic type are used that are called "Acoustic Emission" (AE) sensors.

In particular these sensors are utilized to detect vibrations and noise relating to rotating members.

A fundamental property partly determining the quality of these sensors of the acoustic type is the presence therein of the lowest possible level of spurious vibrations, to avoid said vibrations to be confused with the vibrations that must be perceived by the sensor.

In addition, these sensors are often impinged on by strong ground noise and strong electromagnetic ground fields present in the surrounding atmosphere and caused by electromagnetic units carrying out movement of the rotating members, for example.

These sensors therefore must have a sensitivity adapted to perceive the sought—for vibrations, while at the same time they must not be responsive to said ground noise and electromagnetic ground fields, in order not to be affected thereby.

Due to said possible presence of spurious vibrations or said requirement of not being responsive to ground noise, current sensors of the acoustic type for rotating members detect said vibrations, in many critical applications, only after the same have overcome a predetermined, relatively high, threshold. This fact negatively influences the response times, which become longer, for example about one tenth of a second.

Practically, conventional sensors of the acoustic type are too slow to meet the requirements of present precision mechanics, in particular for tooling.

Just by way of example, in grinding machines for finishing precision workpieces such as gears, the sensors are placed onboard of spindles and electrospindles and they have the task of ensuring the highest possible sensitivity in identifying contact conditions between the rotating tool and the workpiece.

For example, an abrasive grinding wheel must precisely reach the work position, placed in the center of the groove or relief between two teeth of a cylindrical gear wheel and this position is reached gradually.

Each time the grinding wheel touches the gear wheel teeth, it leaves small marks thereon. When a new workpiece is worked which has still coarse surfaces no problem exists because the stock of material to be removed allows a relatively high depth for the first contact or touch mark. But when an already machined piece is to be taken up again for carrying out micrometric corrections, sensitivity in the touching step is indispensable for not leaving marks on the finished piece.

The workpieces machined by these machines are very expensive and the surface finishing quality is one of the fundamental requirements of the finished products.

Practically, it was ascertained that for achieving an optimal finishing, said grinding machines for gears need a response time of the sensors lower than one thousandth of a second.

Therefore, the response time of conventional sensors overcomes the optimal time by two orders of magnitude.

An attempt could be made to reduce the problem by use of a sensor with a higher sensitivity, but this could give rise to wrong perceptions due to the vibrations caused by the mechanical members and the noise generated by the electromagnetic emissions of the windings for operation of the relatively-moving mechanical parts that, among other things, are also present in the sensor itself.

A sensor assembly has already been proposed in a grinding machine operating at high speed, the assembly comprising a vibration detecting transducer arranged on a rotating portion of the grinding machine adjacent the grinding wheel. The transducer emits signals correlated to the detected vibrations and these signals are transmitted through a contactless coupling to a stationary portion of the machine and to a processing and actuating unit for controlling operation of the grinding machine.

The transducer is a piezoelectric element held in a support carried by the rotating portion, and the signals generated by the piezoelectric element are amplified by an electric amplifier disposed on the rotating portion adjacent to the piezoelectric element, before reaching the contactless coupling.

The arrangement of the electric amplifier for the emitted signals on the rotating portion in the vicinity of the sensor, where the signals are stronger, may however cause serious problems due to the noise caused by the strong electromagnetic fields that are just present in this region, for the above mentioned reasons, and may give rise to wrong detections.

It is thus apparent that present sensors cannot meet the working requirements called for in this field.

SUMMARY OF THE INVENTION

Therefore still unresolved is the technical problem of how to provide a sensor assembly for rotating members having response times adapted to precision mechanics and being affected by the smallest possible amount of undesired mechanical vibrations and ground noise due to the couplings present within and adjacent the sensor itself.

Under this situation the technical task underlying the present invention is to devise a precision sensor assembly for rotating members in a machine tool, which is capable of substantially obviating the mentioned drawbacks.

Within the scope of this technical task it is an important aim of the invention to devise a sensor assembly capable of transmitting the signals concerning the sought-for vibrations in very reduced times, in the order of thousandths of a second.

It is a further aim of the invention to devise a sensor assembly capable of minimizing the environmental noise due to friction between the mechanical couplings present in the sensor assembly itself, and capable of transmitting an amplified signal, in spite of the presence of strong electromagnetic fields. Another aim of the present invention is to provide a sensor assembly having a high sensitivity for use within a large range of vibration frequencies.

The technical task mentioned and the aims specified are achieved by a precision sensor assembly for detecting vibrations in a machine tool having at least one rotatable rotor portion (2a) and at least one stationary stator portion (2b), said sensor assembly (1) comprising a rotor unit (16) rigidly fixed to said rotor portion (2a), a stator unit (17) rigidly fixed to said stator portion (2b), means for perceiving vibrations of said rotor portion (2a) and adapted to emit signals correlated with said vibrations, and means for transmitting said signals, said rotor and stator units (16, 17) being arranged separated from each other and said transmitting means including transmitting and receiving elements (10, 11) located in said rotor unit (16) and stator unit (17), respectively, for contactless transmission of said signals between said units (16, 17), wherein said means for perceiving said vibrations are disposed on said rotor unit (16) and comprise a piezoelectric sensitive element (6) and means for mechanical amplification of said vibrations, said mechanical amplification means comprising an elastic element (8) and a counter-mass (7) interposed between said elastic element (8) and said sensitive element (6).

BRIEF DESCRIPTION OF THE DRAWINGS

Further features and advantages of the invention will be better clarified in the following by a detailed description of a preferred embodiment of the invention, with reference to the accompanying drawings, in which:

FIG. 2 shows the grinding wheel referred to in the preceding figure when it is grinding a cylindrical gear wheel;

FIG. 3 is a graph reproducing the time t in the x axis and the intensity I of a signal from a sensor assembly in accordance with the invention in the y axis;

FIGS. 6a and 6b diagrammatically show the flame created at the edges of a grinding wheel during the grinding operation.

DETAILED DESCRIPTION

Figure 1:
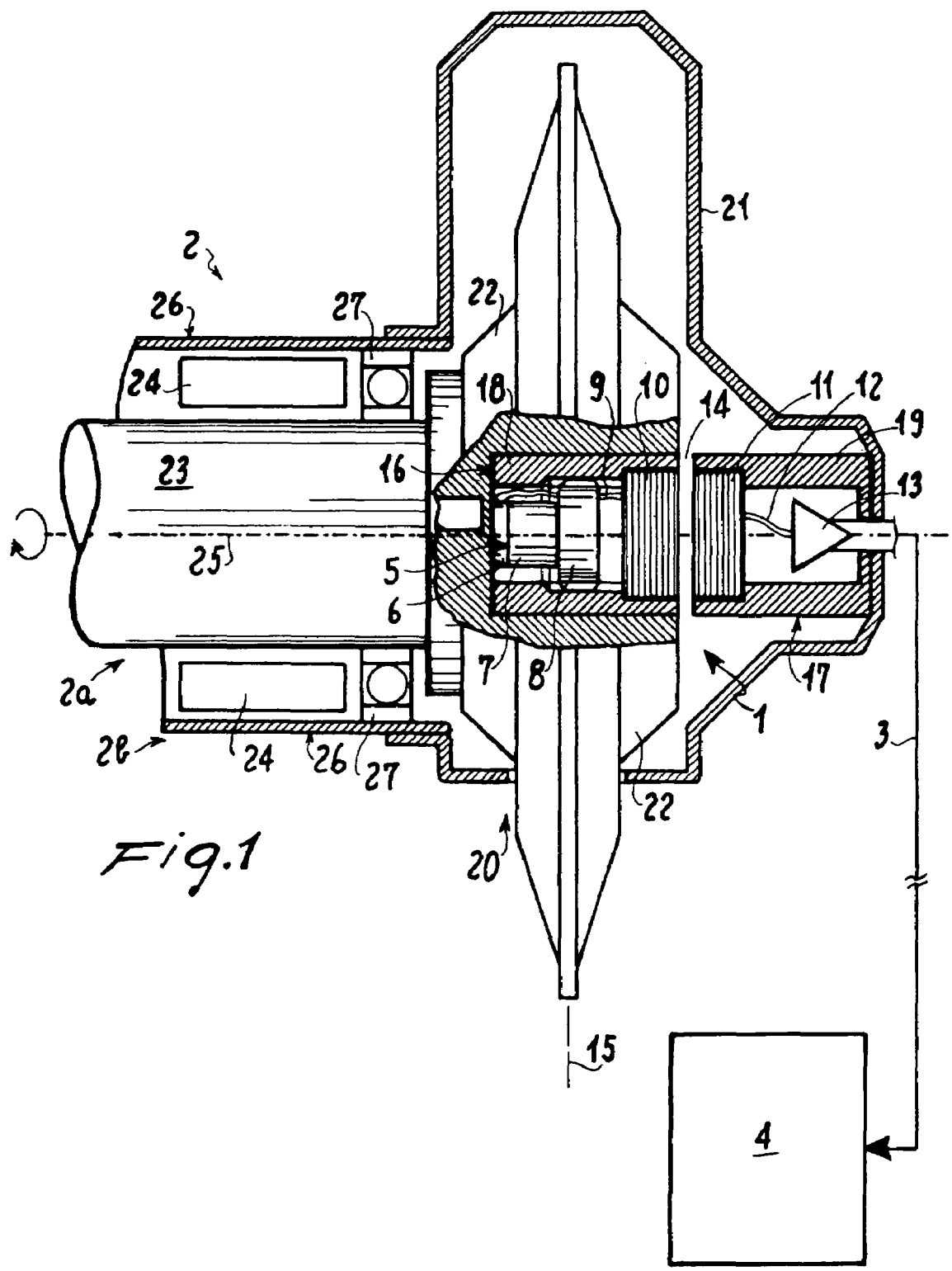
FIG. 1 shows a precision sensor assembly for rotating members, mounted on a grinding wheel of a grinding machine.

With reference to the drawings, denoted at 1 is a sensor assembly according to the invention which, as shown, is applied—by way of example—to a machining apparatus 2 including a grinding wheel 20 for grinding operations. The grinding wheel 20 extends in a plane 15 perpendicular to a rotation axis 25.

The sensor assembly 1 is connected to a regulator 4, through a cable of the screened type 3.

Regulator 4 is an electronic control and operation box containing the control electronics embodied by members known by themselves that are adapted to filter, further amplify and normalize the signals received through cable 3. Also provided are members for converting the analog signals to digital signals and a microprocessor for further processing operations. Included in the control electronics may also be an apparatus for graphic display of the process in progress and commands at the operators' disposal.

The machining apparatus 2 is a portion of a machine tool that in the case herein shown is a precision grinding machine and it appears to be mainly divided into a rotatable rotor portion, generally identified by reference numeral 2a, and a stator portion that is restrained from rotation and is generally identified by reference numeral 2b.

The sensor assembly 1 is at the inside of the machining apparatus 2 and comprises, as the main part thereof, means for perceiving the vibrations of the rotor portion 2a embodied by a sensor 5.

The sensor 5 comprises a sensitive element 6, advantageously of the piezoelectric type, capable of generating electric signals in response to vibrations produced by the operation of the machine tool, and means for mechanical amplification of the vibrations including a counter-mass 7 and an elastic element 8.

In the instance shown the elastic element 8 is placed at an exactly central position with respect to the axis 25 and plane 15 of the grinding wheel 20, and is supported by the same in a position and manner adapted to cause oscillation of the counter-mass 7 against the piezoelectric sensitive element 6.

The elements 6, 7 and 8 of the sensor 5 are also provided to be calibrated and arranged to be able to detect signal variations or vibrations in a very high frequency range, included just as an indication between 1 kHz and 1.5 MHz. Advantageously, the means for mechanical amplification of the vibrations produced by the operation of the machine tool comprise at least one mechanical resonant system.

The resonant system substantially comprises the elastic element 8 and the counter-mass 7, which are so calibrated to define a system oscillating in condition of mechanical resonance at a frequency substantially corresponding to a characteristic frequency of the frequency spectrum of the vibrations generated by the machine tool.

Said calibration may occur by properly selecting the elastic constant or rigidity parameter of the elastic element 8 and the mass of the counter-mass 7, so that a mechanical oscillating system is provided operating in conditions of mechanical resonance at said characteristic frequency of vibration. Operation under these conditions provides a particularly increased mechanical amplification and therefore causes the piezoelectric sensitive element 6 to sense adequately amplified vibrations. The ratio between the useful signals emitted by the piezoelectric sensitive element and the background noise is thus substantially increased.

Advantageously, the resonance frequency of the system formed by the elastic element 8 and by the counter-mass 7 can further be accorded to substantially correspond to the own natural frequencies of the piezoelectric sensitive element 6, so obtaining a further increased amplifying effect and consequently still higher electric signals emitted by the piezoelectric element 6.

The elastic element 8 may be formed for example by a body made of a material such as nylon or derlyn, and may be mounted adjustably relative to the piezoelectric sensitive element 6 in order to adjust the pressure of the elastic element 8 against the counter-mass 7 and the piezoelectric element 6.

The sensor assembly 1 also comprises means for transmitting the signals generated by the sensor 5, said transmitting means comprising a transmitting element 10, electrically connected by a first electric connection 9 to the sensitive element 6 and adapted to transmit the analog signals generated by the sensitive element 6 to a receiving element 11 facing the transmitting element 10.

This transmitting element 10 and the receiving element 11 implement an inductive system and are each formed of a cylinder made of ferrite on which a coil adapted to conduct the electric current is wound. Practically an inductive contactless coupling is obtained.

A second electric connection 12 brings the outputted signals from the inductive receiving element 11 to an electric amplifier 13, which is electrically connected to the regulator 4 by means of the transmission cable 3.

Said transmitting and receiving elements 10, 11 are separated from each other by a gap 14 of about one millimeter. Gap 14 extends parallel to said extension plane 15 of the grinding wheel 20.

The sensor assembly 1 is therefore formed of two parts separated from each other: a rotor unit 16 and a stator unit 17.

The rotor unit 16 is made rigid with the rotating rotor portion 2a of the machining apparatus 2 and is surrounded by a protective shell 18 which is located within, and coaxial to, the grinding wheel 20 and which internally removably holds the sensitive element 6, counter-mass 7, elastic element 8, first electric connection 9 and inductive transmitting element 10.

The stator unit 17 is made rigid with the stationary stator portion 2b of the machining apparatus 2 and is electrically connected to regulator 4 through cable 3. The stator unit 17 is surrounded by a protective shell 19 and comprises, internally thereof, the receiving element 11, the second electric connection 12 and electric amplifier 13.

With reference to the machining apparatus 2 implementing part of a machine tool, it is pointed out that in the rotor portion 2a the abrasive grinding wheel 20 is supported by packing flanges 22 and is fastened to a spindle 23, together with the rotor unit 16 of the sensor assembly 1. The grinding wheel 20 and sensor assembly 1 together with the rotor unit 16 are coaxial with the spindle 23, and are placed at the end thereof.

The rotational movement of the rotor portion 2a is caused by an electric power winding 24 for example, that is supported stationary by the stator portion 2b of the machining apparatus 2.

The stator portion 2b is made up of a body 26, external to spindle 23, and a protective casing 21 of the grinding wheel 20 supporting the stator unit 17 of the sensor assembly 1.

The rotor portion 2a is rotatably supported by the stator portion 2b by means of bearings like bearing 27.

In addition, shown in FIG. 2 is a gear wheel 28 being the object of the machining operation carried out by the machining apparatus 2.

In gear wheel 28—shown in a diagrammatic and simplified manner in FIG. 2—it is possible in particular to see a groove 29 bounded by walls 32 and 33 belonging to teeth 30 and 31, respectively.

In the different graphs (FIGS. 3-5), it is then possible to distinguish an analog signal 34 from the sensor assembly 1, a contact threshold 35 defining a reference value on overcoming of which the contact between the grinding wheel 20 and gear wheel 28, or any other workpiece, is considered as having taken place; and a digital output 36 of the processing electronics downstream of the sensor assembly 1, included in regulator 4.

Figure 4:
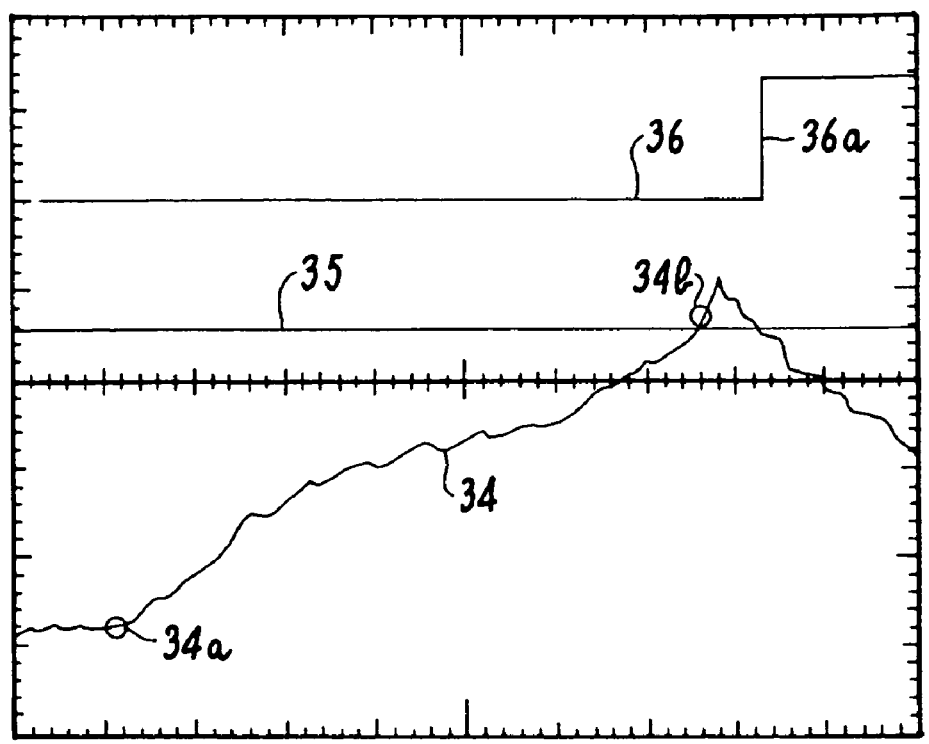
FIG. 4 is a graph having the time t in the x axis and different magnitudes in the y axis, said magnitudes indicating the behavior of a measure-detecting apparatus of known type.
Figure 5:
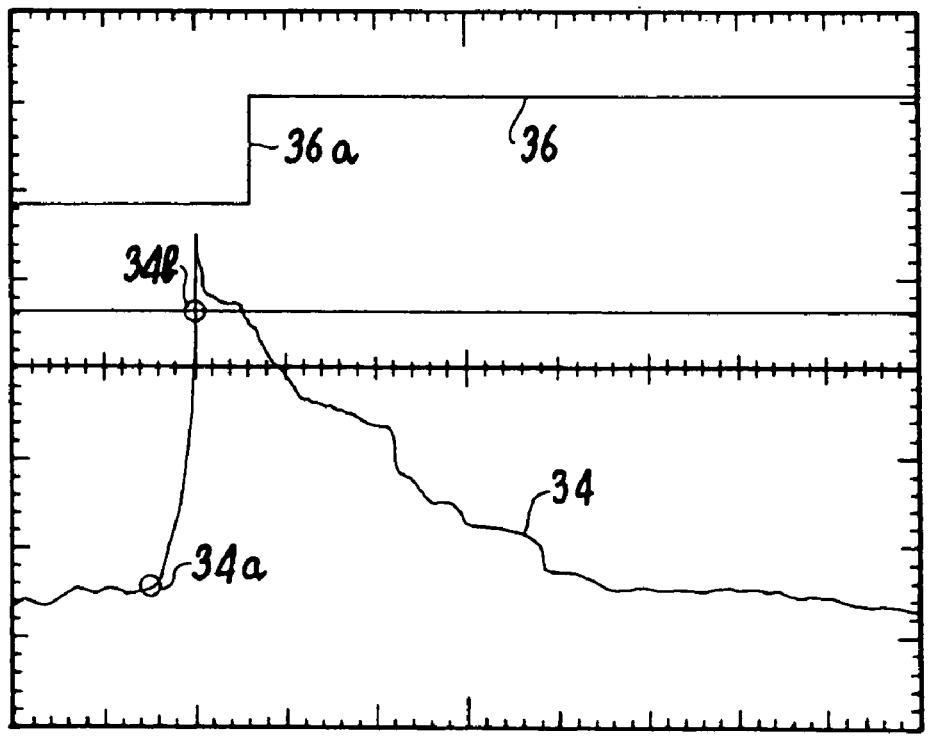
FIG. 5 is a graph similar to the one in FIG. 4, in which however the behavior of a sensor assembly according to the present invention is shown.

For the sake of clarity, shown in the graphs of FIGS. 4 and 5 are: along the line of the analog signal 34, points 34a and 34b indicating beginning of the contact and overcoming of the contact threshold 35, respectively. Also shown is the point of change of value 36a of the digital output 36 of the electronics.

Diagrammatically shown in FIG. 6b is the flame amount due to contact between the grinding wheel 20 and gear wheel 28, covering the whole circumference surrounding the grinding wheel 20, whereas in FIG. 6a a grinding wheel 20 is shown that is concerned with the presence of a single flare 37 of flame.

Operation of the sensor assembly 1, positioned on the machining apparatus 2 and specifically referring to the application shown by way of example, is the following.

The grinding wheel 20 and the cylindrical gear wheel 28 being the object of the machining operation, are disposed with the respective rotation axes perpendicular to each other. The gear wheel 28 is positioned in such a manner that the area momentarily concerned with machining and consisting of teeth 30 and 31 and the groove 29 bounded by said teeth, is close to the grinding wheel 20. The rotor portion 2a is set in motion by means of the power winding 24. In order to find the center of the groove 29 included between the two adjacent teeth 30 and 31 and to machine this region, the grinding wheel 20 and cylindrical gear wheel 28 carry out an approaching movement relative to each other. Identification of groove 29 is made possible through signaling of the occurred contact between the grinding wheel 20 and the walls 32 and 33 of teeth 30 and 31.

By detecting the location of walls 32 and 33, and therefore the distance between said walls, calculation of the relative position of groove 9 and grinding wheel 20 is simple, since a relative approaching between walls 32 and 33 is an indication of the closeness of the groove 29, as can be inferred if one looks at gear wheel 28 in FIG. 2.

The task of the sensor assembly 1 is to perceive the occurred contact and transmit the information to regulator 4.

Practically the sensor assembly 1 is utilized as a touch probe.

To detect the occurred contact between grinding wheel 20 and gear wheel 28, the sensor assembly 1 uses the sensor 5.

In fact, contact between the grinding wheel 20 and walls 32 or 33 gives rise to vibrations and these vibrations cause the elastic element 8 to oscillate and to set the counter-mass 7 in motion, which mass is rigidly fixed to and acts on the sensitive element 6.

The piezoelectric sensitive element 6 converts the mechanical vibrations, amplified by the elastic element 8 and counter-mass 7, into analog electric signals 34.

It will be recognized that the sensor 5 is not a conventional accelerometer nor is it used as a conventional accelerometer, but it is used for detecting very quick signal variations and is such structured and calibrated that it detects frequencies greatly higher than those of conventional accelerometers.

In fact it is capable of covering a frequency spectrum included between about 1 kHz and 1.5 MHz and beyond, instead of covering the classic frequency band from about 0.1 Hz to about 10 kHz, as occurring generally in using accelerometers for detecting unbalances.

The analog signals 34 outputted from the rotating piezoelectric sensitive element 6 are transmitted through the first electric connection 9 to the rotating transmitting element 10, from which the signals 34 are transmitted inductively and contactless to the stationary receiving element 11. The rotor and stator units 16, 17 are in fact separated by a gap 14, practically defined by an air cushion and are not at all connected by cables, fibers or the like.

The signals 34 therefore reach the inductive receiving element 11 that in turn transmits them to the electric amplifier 13, that is positioned far away from the electromagnetic currents generated by the power winding 24.

From the electric amplifier 13 the analog signals 34 reach the regulator 4 through the cable 3.

During the search process to find the center of groove 29, as above described, it is fundamental for the grinding wheel 20 not to penetrate or grind the teeth 30 and 31 of the cylindrical gear wheel 28 too much.

To judge whether the operation quality is good, two factors correlated with each other are used: the depth of the mark left by the grinding wheel 20 on getting into contact with the side walls 32 and 33, and the amount of the flame generated during contact and propagating along the grinding wheel edges, as diagrammatically shown in FIGS. 6a and 6b.

In finishing machining, such as grinding of an object, it is suitable that the depth of the mark should not overcome 5 microns or, by examining a factor that can be more easily seen by the operator, that propagation of the flame should take place for about one fourth of the circumference consisting of the grinding wheel edges, as diagrammatically shown in FIG. 6a.

Once the movement parameters of the machine have been allocated, if for the grinding wheel 20 a typical rotation speed in the order of 900 revolutions per minute is indicated, the grinding wheel 20 will cover one fourth of a circumference in about 17 thousandths of a second. This is the maximum time gap for contact between the two parts, to leave marks of first contact that are less than 5 microns deep.

In about 17 thousandths of a second, the sensor assembly 1 must perceive and transmit the signals of the occurred contact, and regulator 4, if the contact threshold 35 has been overcome, must command stopping of the grinding wheel 20 through a digital electric output signal 36.

The inner reaction time of the electronics in regulator 4 is of about 1 thousandth of a second, whereas the reaction time of the members stopping the displacement of the grinding wheel 20 toward the gear 28 is about 16 thousandths of a second.

The sensor assembly 1 must therefore react in less than one thousandth of a second and this immediate reaction really occurs because with the invention a flame amount equal to or lower than one fourth of a circumference of the grinding wheel 20 is noticed.

The invention achieves important advantages.

The sensor assembly 1 reveals to be much more responsive to vibrations than conventional AE-sensors. In fact the response time from a delay of 100 thousandths of a second of conventional AE-sensors goes to less than 1 thousandth of a second of the sensor assembly 1 according to the invention. The achieved advantages, by virtue of this great reduction in the response time of sensor assembly 1, are very important.

In the example of the machining apparatus 2 previously described by way of example, the movements of the abrasive grinding wheel 20 can be stopped in about 17 thousandths of a second instead of requiring about 117 thousandths of a second.

Therefore, as diagrammatically shown in FIG. 6b, the grinding wheel 20 can be stopped when the same has generated a flame amount surrounding only one fourth of the grinding wheel circumference at most.

Graphs in FIG. 4 show the course of the previously described process by using conventional sensors, still referring to apparatus 2.

It will be recognized that the stop command for the rotor portion 2a that can be noticed from the change of value at point 36a of the digital electronic response signal 36 outputted from regulator 4, takes place after the vibrations of the grinding wheel 20 indicated by the analog electric signal 34 have propagated for several tenth of a second, which may also be more than 100 thousandths of a second.

This is mainly due to the fact that between beginning of the vibrations due to contact, which beginning takes place at point 34a, and detection of the contact by the sensor assembly 1, taking place at point 34b, at least about 100 thousandths of a second elapse.

On the contrary, shown in FIG. 5 are the graphs obtained with use of the present sensor assembly 1, still with reference to apparatus 2: regulator 4 emits the digital electronic signal 36 for stopping the grinding wheel 20 at point 36a, after the vibrations of said grinding wheel 20, indicated by the analog electric signal 34, have propagated for less than 2 thousandths of a second.

In particular it is possible to see that sensor assembly 1 carries out detection of the contact, which contact detection takes place at point 34b, in less than 1 thousandth of a second starting from the moment said contact has occurred, i.e. at point 34a.

A further advantage is given by the fact that sensor assembly 1 of the present invention is made up of two parts rotatable relative to each other, a stator unit 17 and a rotor unit 16, that are not in contact with each other. Consequently, there is no ground noise that can interfere with the operation of sensor assembly 1, due to the relative movement of the mechanical parts.

This full separation between the stator unit 17 and rotor unit 16 in addition, eliminates the mechanical friction in this region and also energy dissipation, which would cause wear of the above units and, as a result, a periodic replacement of same.

Another important advantage resides in the amplification of the vibrations being initially mechanical. This allows the piezoelectric element to generate electric signals which are practically unaffected by spurious components and do not need to be further amplified.

In fact a clean transmission of electric signals 34 from the piezoelectric sensitive element 6 to the electric amplifier 13 in the regions subjected to the influence of the electromagnetic currents generated by the electric power winding 24 is made possible by the mechanical amplification of the signal carried out by the sensor 5 that is not invalidated by said electromagnetic fields, which would occur if an electric amplifier would be located in this region, as known from the prior art. Close to the end of the machining apparatus 2 at the stator unit 17 and the receiving element 11, the electromagnetic fields caused by the electric power winding 24 are weaker, and the electric amplifier 13 is practically no more affected by these fields. This amplifier is the last generation stage of the electric signal of sensor assembly 1 that is now ready for transmission to the regulator 4. The invention is susceptible of many changes falling within the scope of the appended claims. It will be recognized that the sensor assembly 1 can be utilized for different applications contemplating use of a sensor in a member set in rotation.

In particular the sensor assembly 1 can be utilized in the sector of machine tools, in different types of grinding machines, lathes, milling machines, machining centers.

The invention claimed is:

1. A precision sensor assembly for detecting vibrations in a machine tool having at least one rotatable rotor portion (2a) and at least one stationary stator portion (2b), said sensor assembly (1) comprising:

a rotor unit (16) rigidly fixed to said rotor portion (2a);

a stator unit (17) rigidly fixed to said stator portion (2b);

means for perceiving vibrations of said rotor portion (2a) and adapted to emit signals correlated with said vibrations;

and means for transmitting said signals;

said rotor and stator units (16, 17) being arranged separated from each other and said transmitting means including transmitting and receiving elements (10, 11) located in said rotor unit (16) and stator unit (17), respectively, for contactless transmission of said signals between said units (16, 17);

wherein said means for perceiving said vibrations are disposed on said rotor unit (16) and comprise a piezoelectric sensitive element (6) and means for mechanical amplification of said vibrations, said mechanical amplification means comprising an elastic element (8) and a counter-mass (7) interposed between said elastic element (8) and said sensitive element (6);

wherein said means for mechanical amplification of said vibrations comprise at least one mechanical resonant system, and wherein said at least one mechanical resonant system comprises said elastic element (8) and said counter-mass (7), said elastic element (8) and said counter-mass (7) being calibrated to oscillate in condition of mechanical resonance at a frequency substantially corresponding to a characteristic frequency of a frequency spectrum of said vibrations.

2. A sensor assembly as claimed in claim 1, wherein said elastic element (8) and said counter-mass (7) are further calibrated to oscillate in condition of mechanical resonance at a frequency substantially corresponding to own natural frequencies of said piezoelectric sensitive element (6).

3. A sensor assembly as claimed in claim 1, wherein said perceiving means are calibrated to detect vibrations within a range of frequencies substantially between 1 kHz and 1.5 MHz.

4. A sensor assembly as claimed in claim 1, wherein said elastic element (8) is mounted adjustably relative to said piezoelectric element (6) for adjusting elastic pressure of said elastic element (8) against said counter-mass (7) and said piezoelectric element (6).

5. A sensor assembly as claimed in claim 1, wherein said piezoelectric element (6), said counter-mass (8) and said elastic element (7) are removably located within a protective shell (18) arranged within, and coaxially to, a grinding wheel of said machine tool.

6. A machine tool comprising at least one rotatable rotor portion (2a) and at least one stationary stator portion (2b), and a precision sensor assembly, said sensor assembly (1) comprising:

a rotor unit (16) rigidly fixed to said rotor portion (2a);

a stator unit (17) rigidly fixed to said stator portion (2b);

means (5) for perceiving vibrations of said rotor portion (2a) and for emitting signals correlated with said vibrations;

means for transmitting said signals;

said rotor and stator units (16, 17) being arranged separated from each other and said transmitting means including transmitting and receiving elements (10, 11) located in said rotor unit (16) and stator unit (17), respectively, for contactless transmission of said signals between said units (16, 17);

wherein said means for perceiving said vibrations are disposed on said rotor unit (16) and comprise a piezoelectric sensitive element (6) and means for mechanical amplification of said vibrations, said mechanical amplification means comprising an elastic element (8) and a counter-mass (7) interposed between said elastic element (8) and said sensitive element (6);

wherein said machine tool further comprises means (4) for controlling operation of the machine tool in response to said signals;

wherein said means for mechanical amplification of said vibrations comprise at least one mechanical resonant system, and wherein said at least one mechanical resonant system comprises said elastic element (8) and said counter-mass (7), said elastic element (8) and said counter-mass (7) being calibrated to oscillate in condition of mechanical resonance at a frequency substantially corresponding to a characteristic frequency of a frequency spectrum of said vibrations.

7. A machine tool as claimed in claim 6, wherein said elastic element (8) and said counter-mass (7) are further calibrated to oscillate in condition of mechanical resonance at a frequency substantially corresponding to own natural frequencies of said piezoelectric sensitive element (6).

8. A machine tool as claimed in claim 6, comprising an abrasive grinding wheel (20) rigidly supported by said rotor portion (2a), wherein said elastic element (8) is supported centrally and oscillatingly within said grinding wheel (20) and is calibrated for mechanically amplifying vibrations of said grinding wheel (20) and for setting said counter-mass (7) in motion against said sensitive element (6).

* * * * *